(12) United States Patent
Upton et al.

(10) Patent No.: US 11,550,038 B2
(45) Date of Patent: Jan. 10, 2023

(54) LIDAR SYSTEM WITH ANAMORPHIC OBJECTIVE LENS

(71) Applicant: Apple Inc., Cupertino, CA (US)

(72) Inventors: Robert S. Upton, Mountain View, CA (US); Alexander Shpunt, Portola Valley, CA (US); Andrew J. Sutton, Sunnyvale, CA (US); Chandra S. Kakani, Fremont, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 923 days.

(21) Appl. No.: 16/388,450

(22) Filed: Apr. 18, 2019

(65) Prior Publication Data
US 2020/0096615 A1    Mar. 26, 2020

Related U.S. Application Data

(60) Provisional application No. 62/736,478, filed on Sep. 26, 2018.

(51) Int. Cl.
   *G01S 7/00* (2006.01)
   *G01S 7/481* (2006.01)
   (Continued)

(52) U.S. Cl.
   CPC .......... *G01S 7/4817* (2013.01); *G01S 7/4816* (2013.01); *G01S 7/4865* (2013.01); *G01S 17/10* (2013.01); *G01S 17/89* (2013.01); *G02B 13/08* (2013.01)

(58) Field of Classification Search
   USPC ....................................................... 356/5.01
   See application file for complete search history.

(56) References Cited

U.S. PATENT DOCUMENTS

| 4,457,621 A | 7/1984 | Harris et al. |
| 5,506,394 A | 4/1996 | Plesko |

(Continued)

FOREIGN PATENT DOCUMENTS

| WO | 2006085834 A1 | 8/2006 | |
| WO | WO-2017018152 A1 * | 2/2017 | ............. G01S 17/89 |

OTHER PUBLICATIONS

International Application # PCT/US2019/042106 search report dated Oct. 30, 2019.

(Continued)

*Primary Examiner* — James R Hulka
(74) *Attorney, Agent, or Firm* — Kligler & Associates Patent Attorneys Ltd

(57) ABSTRACT

An optical device includes a transmitter, which emits a beam of optical radiation, and a receiver, which includes a detector configured to output a signal in response to the optical radiation. An active area of the detector has a first dimension along a first axis and a second dimension, which is less than the first dimension, along a second axis perpendicular to the first axis. An anamorphic lens, which collects and focuses the optical radiation onto the active area of the detector, has a first focal length in a first plane containing the first axis and a second focal length, greater than the first focal length, in a second plane containing the second axis. A scanner scans the beam across a target scene in a scan direction that is aligned with the first axis, and directs the optical radiation that is reflected from the target scene toward the receiver.

16 Claims, 5 Drawing Sheets

(51) Int. Cl.
  *G01S 17/89* (2020.01)
  *G01S 7/4865* (2020.01)
  *G02B 13/08* (2006.01)
  *G01S 17/10* (2020.01)

(56) References Cited

U.S. PATENT DOCUMENTS

| | | | |
|---|---|---|---|
| 6,005,722 A | 12/1999 | Butterworth et al. | |
| 6,719,429 B2* | 4/2004 | Peterson | G03B 21/208 |
| | | | 353/38 |
| 7,550,712 B2* | 6/2009 | Tomioka | G02B 3/04 |
| | | | 359/215.1 |
| 7,588,187 B2 | 9/2009 | Barkan et al. | |
| 7,701,557 B2* | 4/2010 | Doemens | G01S 17/931 |
| | | | 356/5.01 |
| 7,925,129 B2 | 4/2011 | Ghosh et al. | |
| 8,783,866 B2 | 7/2014 | Hart et al. | |
| 9,068,917 B1 | 6/2015 | Vaez-Iravani et al. | |
| 9,651,417 B2 | 5/2017 | Shpunt et al. | |
| 10,802,115 B2* | 10/2020 | Ishikawa | G01S 7/4816 |
| 2002/0130264 A1 | 9/2002 | Wichner | |
| 2002/0140911 A1* | 10/2002 | Peterson | G03B 33/08 |
| | | | 348/E5.142 |
| 2007/0091402 A1* | 4/2007 | Tomioka | G02B 3/04 |
| | | | 359/201.1 |
| 2007/0181786 A1 | 8/2007 | Doemens et al. | |
| 2010/0309537 A1* | 12/2010 | Tanahashi | G02B 26/125 |
| | | | 359/213.1 |
| 2013/0223846 A1 | 8/2013 | Joseph et al. | |
| 2014/0240691 A1 | 8/2014 | Mheen et al. | |
| 2015/0168554 A1 | 6/2015 | Aharoni et al. | |
| 2016/0146939 A1 | 5/2016 | Shpunt et al. | |
| 2016/0313445 A1 | 10/2016 | Bailey et al. | |
| 2017/0214839 A1 | 7/2017 | Keller et al. | |
| 2017/0242109 A1 | 8/2017 | Dussan et al. | |
| 2017/0245747 A1 | 8/2017 | Soudagar | |
| 2017/0269215 A1 | 9/2017 | Hall et al. | |
| 2017/0352771 A1 | 12/2017 | Gu et al. | |
| 2018/0372847 A1 | 2/2018 | Upton et al. | |
| 2018/0224530 A1 | 8/2018 | Ishikawa | |
| 2019/0094531 A1 | 3/2019 | Axelrod et al. | |

OTHER PUBLICATIONS

U.S. Appl. No. 15/849,701 office action dated May 15, 2020.
U.S. Appl. No. 15/849,696 office action dated Apr. 2, 2019.

\* cited by examiner

LIDAR SYSTEM WITH ANAMORPHIC OBJECTIVE LENS

CROSS-REFERENCE TO RELATED APPLICATION

This application claims the benefit of U.S. Provisional Patent Application 62/736,478, filed Sep. 26, 2018, which is incorporated herein by reference.

FIELD OF THE INVENTION

The present invention relates generally to opto-electronic devices, and particularly to optical scanners.

BACKGROUND

LiDAR systems measure distance to a target by illuminating a target with pulsed laser radiation and then sensing the times of flight (ToF) of the pulses reflected from the target. A three-dimensional (3D) map of a target scene can be produced by scanning the laser pulses across the scene and measuring ToF as a function of angle. In a typical LiDAR scanner, a transmitter sends out a beam of light; the beam is scanned across the target scene by a scanner, such as a scanning mirror; and then the light returned from the object is collected by collection optics and is directed to a sensor, which emits a signal to a controller for further analysis.

For example, U.S. Pat. No. 9,651,417 describes a scanning depth engine, which includes a transmitter, which emits a beam comprising pulses of light, and a scanner, which is configured to scan the beam, within a predefined scan range, over a scene. A receiver receives the light reflected from the scene and generates an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

SUMMARY

Embodiments of the present invention that are described hereinbelow provide improved optical scanners and methods for scanning.

There is therefore provided, in accordance with an embodiment of the invention, an optical device, including a transmitter, which is configured to emit a beam of optical radiation, and a receiver, including a detector, which is configured to output a signal in response to the optical radiation that is incident on an active area of the detector. The active area has a first dimension along a first axis and a second dimension, which is less than the first dimension, along a second axis perpendicular to the first axis. An anamorphic lens is configured to collect and focus the optical radiation onto the active area of the detector, and has a first focal length in a first plane containing the first axis and a second focal length, greater than the first focal length, in a second plane containing the second axis. A scanner is configured to scan the beam across a target scene in a scan direction that is aligned with the first axis, and to direct the optical radiation that is reflected from the target scene toward the receiver.

In a disclosed embodiment, the scanner includes at least one mirror, which is configured to rotate about a rotation axis perpendicular to the scan direction, while reflecting the beam emitted by the transmitter toward the target scene and reflecting the optical radiation that is reflected from the target scene toward the receiver.

In some embodiments, the scanner is configured to scan the beam across the target scene at a first scanning speed in a first scan direction and at a second scanning speed, less than the first scanning speed, in a second scan direction perpendicular to the first scan direction, wherein the first scan direction is aligned with the first axis of the detector.

In a disclosed embodiment, the first dimension of the active area of the detector is at least twice the second dimension.

Additionally or alternatively, the anamorphic lens has a non-circular pupil. Further additionally or alternatively, the anamorphic lens includes a plurality of optical surfaces, and at least one of the optical surfaces is shaped so as to correct an astigmatism due to the second focal length being greater than the first focal length.

In some embodiments, the transmitter is configured to emit the optical radiation as a sequence of optical pulses, and the first dimension of the active area of the detector is chosen so as to accommodate an angular offset between the emitted beam and the reflected optical radiation due to a time of flight of the optical pulses. In one embodiment, the signal output by the detector is indicative of the time of flight of the optical pulses, and the device includes a controller, which is configured to process the signal so as to map a distance to the target scene.

There is also provided, in accordance with an embodiment of the invention, an optical method, which includes scanning a beam of optical radiation across a target scene in a scan direction. The optical radiation that is reflected from the scene is directed toward a receiver, which includes a detector, which outputs a signal in response to the optical radiation that is incident on an active area of the detector. The active area has a first dimension along a first axis, which is aligned with the scan direction, and a second dimension, which is less than the first dimension, along a second axis perpendicular to the first axis. An anamorphic lens, which collects and focuses the optical radiation onto the active area of the detector, has a first focal length in a first plane containing the first axis and a second focal length, greater than the first focal length, in a second plane containing the second axis.

The present invention will be more fully understood from the following detailed description of the embodiments thereof, taken together with the drawings in which:

DETAILED DESCRIPTION OF EMBODIMENTS

Overview

Figure 1:
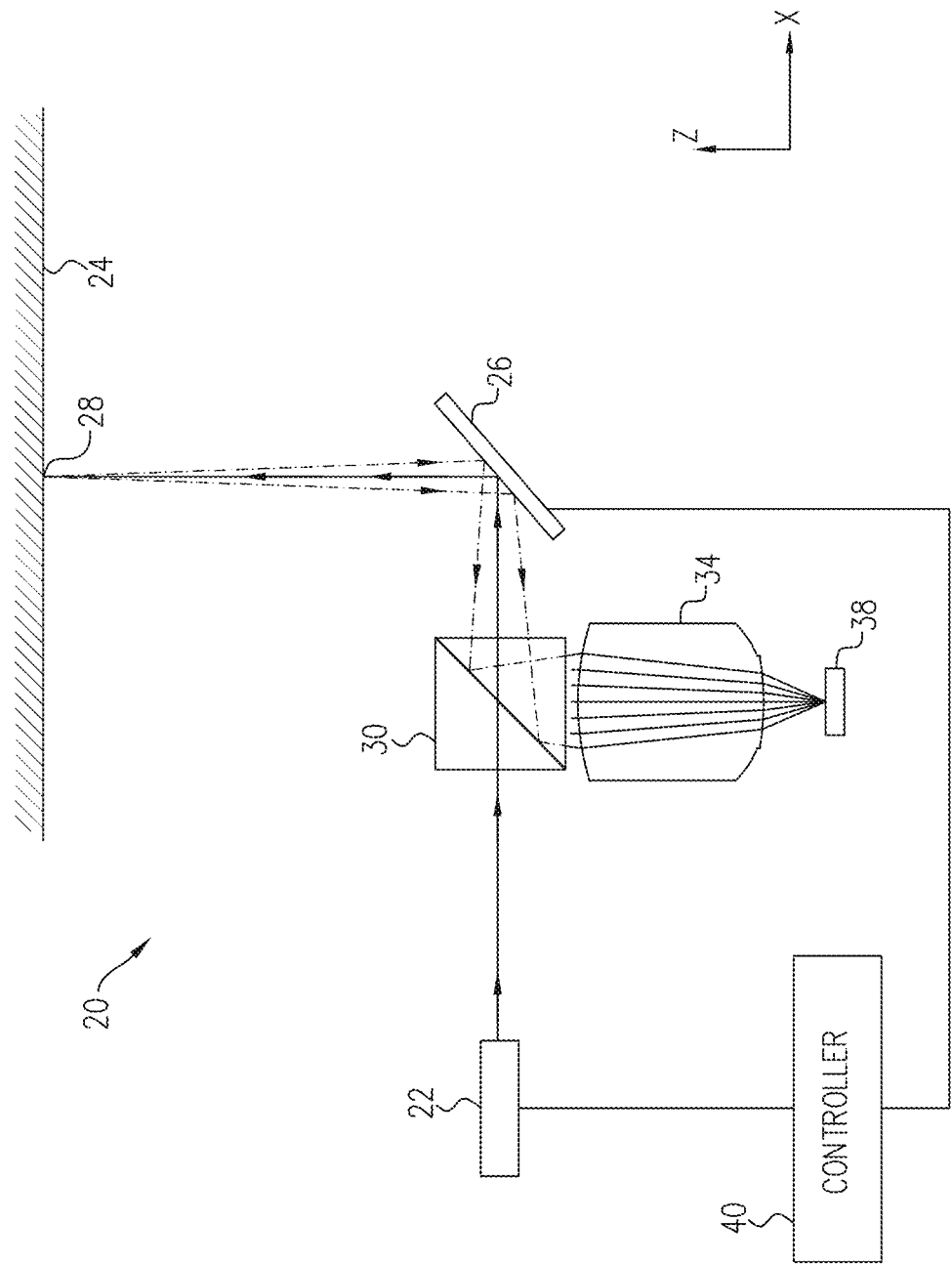
FIG. 1 is a schematic side view of a LiDAR system with anamorphic optics, in accordance with an embodiment of the invention.

High-performance optical scanning systems, such as those used in demanding LiDAR applications, for example, commonly use high-intensity light beams and high-speed scanners in order to sample and sense distant target scenes with high spatial and temporal resolution and high signal-to-noise ratio. The distance to the target scene may range from tens of centimeters to hundreds of meters.

The beam emitted by the transmitter in the LiDAR system is scanned across the target scene by a high-speed scanner, for instance by a rapidly-oscillating scanning mirror. The light reflected from the scene is directed by a scanning mirror (either the scanning mirror used for the transmitted beam or another mirror synchronized to this mirror) toward a collection lens. This lens focuses the returned light into a small spot on a detector, and the signal emitted by the detector is received by a controller for further analysis.

High-speed scanners are employed in this application to maximize the measurement rate (meaning high frame rate and measurement throughput). At high angular speeds and large target distances, the round-trip time for light can introduce a significant time lag between the firing of a pulse by the transmitter and its detection at the receiver, resulting in a lag angle of the received beam relative to the transmitted beam. This phenomenon can produce a streak of light on the detector along the scan direction. In order to compensate for deviations of the focused spot due to this lag, a detector with a large active area is required, with dimensions that increase linearly with frame rate, mirror angular frequency, and distance. (The term "active area" is used in the present description and in the claims to mean the area of the detector that is exposed to incident photons and converts them into electrical charge.) This large active area, however, increases the dark current and capacitance of the detector, thus increasing the detector noise level and decreasing its temporal bandwidth. These factors reduce the sensitivity and signal/noise ratio (SNR), and hence limit the useful range of the LiDAR system.

It is therefore desirable to use a detector with the smallest possible active area that still captures the reflected beam efficiently, including accommodation for the expected lag angle between transmitted and received beams. To accommodate such a small detector calls for a collection lens with the smallest possible focal length and the largest possible aperture. The ratio of the lens focal length to aperture diameter is the F-ratio. Hence, making the F-ratio as small as possible is generally a positive attribute for scanning LiDAR systems. For small F-ratios, however, the manufacturing tolerances of the receiver become significantly tighter, thus making the receiver more difficult and costly to fabricate. These practical limitations place a lower bound on the dimensions of the active area of the detector, which in turn limits the system bandwidth and SNR.

Embodiments of the present invention that are described herein address these problems by using a receiver comprising a detector and optics that are not rotationally symmetrical about the beam axis. These embodiments take advantage of the fact that the scanners used in most LiDAR systems scan much faster in one angular direction than another, or may scan only in a single direction. (The term "fast direction" is used herein to refer to the direction in which scanning is faster, as well as to the sole scan direction in single-axis scanners, while the orthogonal direction is referred to as the "slow direction.") For example, in a raster scan, the angular speed of scanning along the (horizontal) scan lines is typically tens or hundreds of times faster than the angular speed in the orthogonal (vertical) sweep direction. Therefore, the angular lag between the transmitted and received beams will be much larger along the fast direction than the slow direction.

Thus, in the embodiments that are described herein, the active area of the detector is elongated along a direction that is aligned with the fast scan direction. The collection lens is anamorphic, so that the receiver has different focal lengths and aperture diameters in the two transverse planes of the pupil, with a shorter focal length and larger pupil diameter along the elongated dimension of the detector. In addition, at least one of the optical surfaces of the collection lens may desirably be shaped so as to correct residual astigmatism due to the anamorphic focusing properties. Using this approach, for a given pupil area and etendue of the collection lens, the active area of the detector can be minimized—with the result that the overall SNR and bandwidth are increased relative to comparable rotationally-symmetrical designs.

Based on these considerations, the disclosed embodiments provide an optical device, comprising a transmitter, which emits a beam of optical radiation toward a target scene, typically (although not necessarily) a pulsed beam. A receiver comprises a detector, having an active area that receives the optical radiation that is reflected from the target scene, and outputs a corresponding signal. The active area of the detector has different first and second dimensions along respective first and second axes, wherein the first dimension is greater than the second dimension, for example at least twice the second dimension. The reflected optical radiation is collected and focused onto the active area of the detector by an anamorphic lens, which has a first focal length in a first plane containing the first axis and a second focal length, greater than the first focal length, in a second plane containing the second axis.

A scanner scans the transmitted beam across the target scene in a scan direction that is aligned with the first axis of the detector, and directs the optical radiation that is reflected from the target scene toward the receiver. The term "aligned" in this context means that the scan direction is projected onto the detector by the collection optics (such as the anamorphic lens) along a direction that is parallel to the first axis. In the disclosed embodiments, the scanner comprises at least one mirror, which rotates about a rotation axis perpendicular to the scan direction. Alternatively, other suitable sorts of scanners may be used, such as an acousto-optic scanner. Typically (although not necessarily), the scanner scans the transmitted beam across the target scene at a first scanning speed in a first scan direction and at a second scanning speed, less than the first scanning speed, in a second scan direction perpendicular to the first scan direction. In this case, it is the first scan direction that is aligned with the first axis of the detector.

System Description

FIG. 1 is a schematic side view of LiDAR system 20, in accordance with an embodiment of the invention. The beam from a transmitter 22 is directed toward a target scene 24 by a scanning mirror 26, thus forming and scanning an illumination spot 28 over the target scene. (The terms "light," "illumination" and "optical radiation" are used herein interchangeably to refer to electromagnetic radiation in the visible, infrared, and/or ultraviolet range.) Transmitter 22 is assumed in the present example to comprise a pulsed laser source. Alternatively, transmitter 22 may comprise a continuous-wave laser or a non-laser source, such as a thermal source, a solid-state source, or a gas discharge source. The fast scanning direction of scanning mirror 26 is taken to be the X-axis, as shown in FIG. 1, while the Y-axis (which is the slow scanning direction in this embodiment) is perpendicular to the plane of the page.

The optical radiation returned from illumination spot 28 is reflected by scanning mirror 26, via a beamsplitter 30, toward an anamorphic collection lens 34, which focuses the light onto the active area of a detector 38. In the present embodiment, detector 38 outputs a signal, such as an electrical pulse, in response to the optical radiation that is incident on the active area. This signal is indicative of the time of flight of the optical pulses to and from target scene 24. For this purpose, detector 38 may comprise, for example, a single-photon avalanche diode (SPAD) or an avalanche photodiode (APD). The dimensions of the active area of detector 38 are elongated in the X-direction relative to the Y-direction. The dimension in the X-direction is chosen so as to accommodate the angular offset between the emitted beam and the reflected optical radiation due to the time of flight of the optical pulses, and thus resolves the problem of the light streak mentioned above.

A controller 40 is connected to transmitter 22, scanning mirror 26, and detector 38. Controller 40 drives transmitter 22 and scanning mirror 26, and receives and analyzes the signals output by detector 38. In the present example, controller 40 measures times of arrival of photons at detector 38 relative to pulses emitted by transmitter 22, in order to derive times-of-flight across the target scene and thus to produce a depth map indicating the distances from system 20 to the target scene.

Figure 2A:
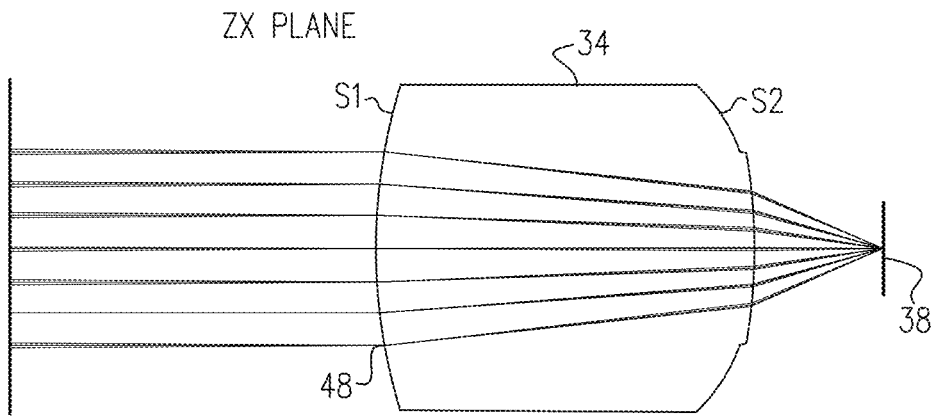
FIGS. 2A and 2B are schematic, sectional views of an anamorphic lens, showing ray traces through the lens in two orthogonal planes, in accordance with an embodiment of the invention.
Figure 2B:
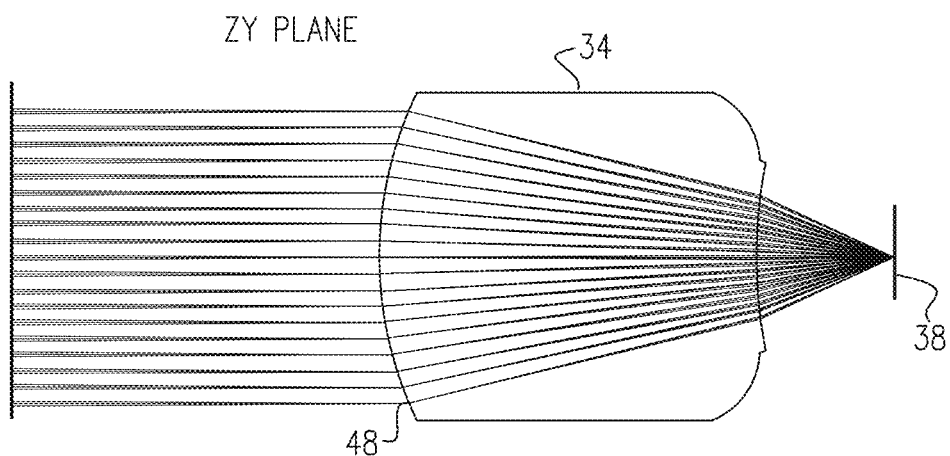
Figure 2C:
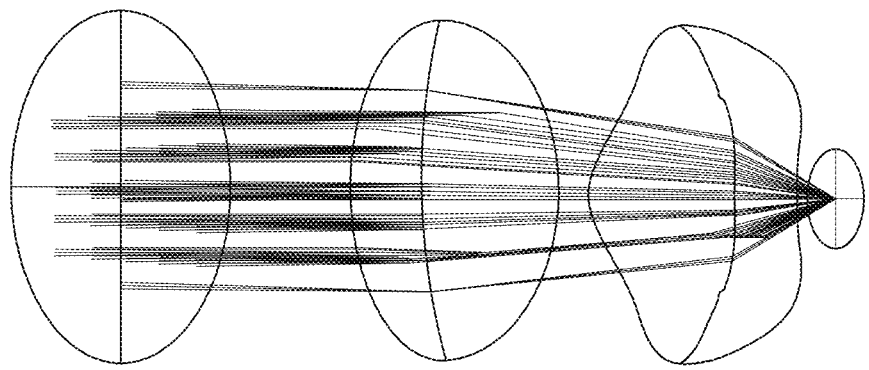
FIG. 2C is a schematic, perspective view of the anamorphic lens of FIGS. 2A/B.
Figure 2D:
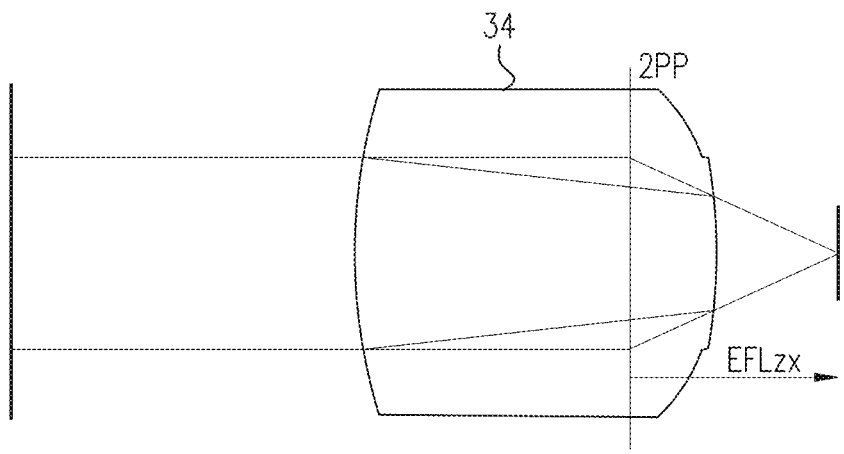
FIGS. 2D and 2E are schematic, sectional views of the anamorphic lens of FIGS. 2A/B, showing the secondary principal planes and effective focal lengths of the lens in the two orthogonal planes.
Figure 2E:
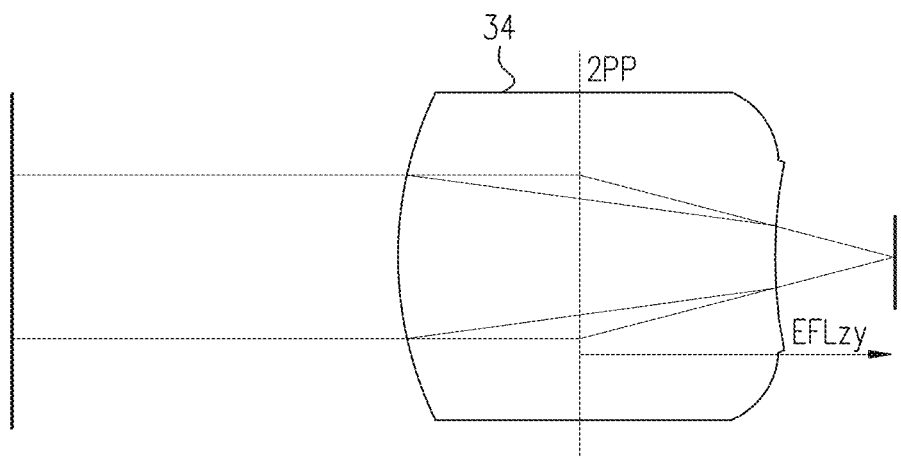

Reference is now made to FIGS. 2A-2E, which schematically illustrate anamorphic collection lens 34, in accordance with an embodiment of the invention. FIGS. 2A and 2B are sectional views showing ray traces through lens 34 in the ZX and ZY planes, respectively, while FIG. 2C is a schematic, perspective view. FIGS. 2D and 2E are schematic, sectional views of lens 34, showing the secondary principal planes and effective focal lengths of the lens in the ZX and ZY planes, respectively. Based on the locations of the secondary principle planes (labeled 2PP in FIGS. 2D and 2E), it can be seen that the effective focal length of lens 34 in the ZX plane (EFLzx) is half the effective focal length in the ZY plane (EFLzy).

As noted earlier, lens 34 has a pupil 48 that is not circularly symmetrical, but rather has a larger diameter in the ZY plane than in the ZX plane. Pupil 48 may be elliptical, for example, with diameters $D_1$ and $D_2$ in the ZX and ZY planes, respectively. For a given pupil area A and respective focal lengths $f_1$ and $f_2$ in the ZX and ZY planes, the optimal choice of the diameters, in order to minimize spherical aberration, is given by the formulas:

$$D_2 = \left(\frac{f_2}{f_1}\right)^{3/4} D_1 \quad A = \frac{\pi}{4} D_1 D_2$$

Figure 3B:
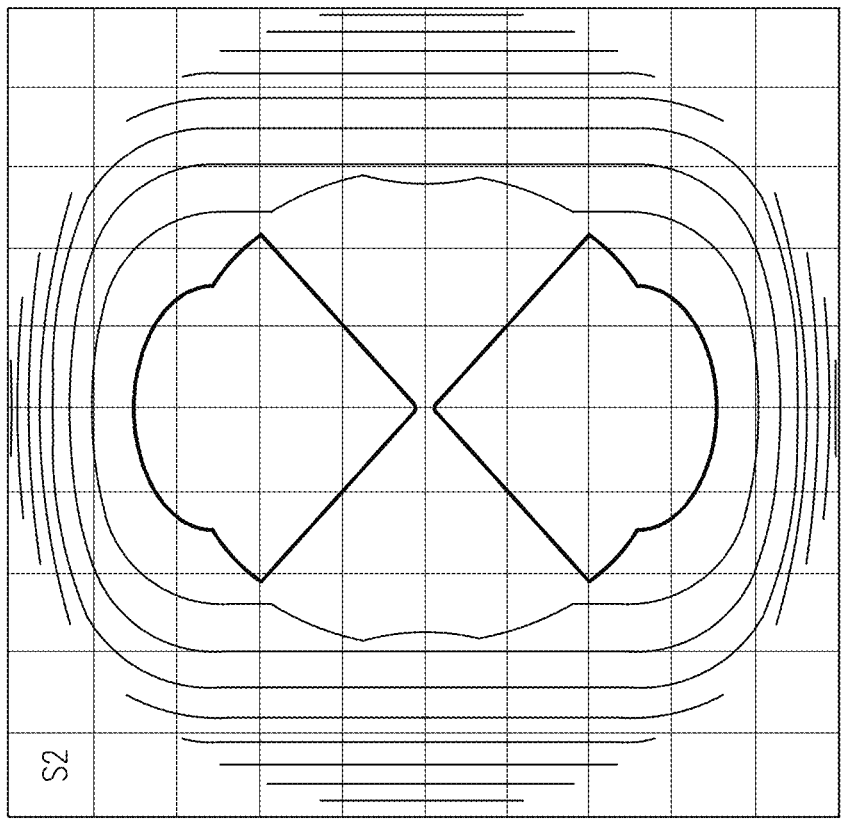
FIGS. 3A and 3B are contour plots that schematically illustrate the shapes of the front and rear surfaces of an anamorphic lens, in accordance with an embodiment of the invention.
Figure 3A:
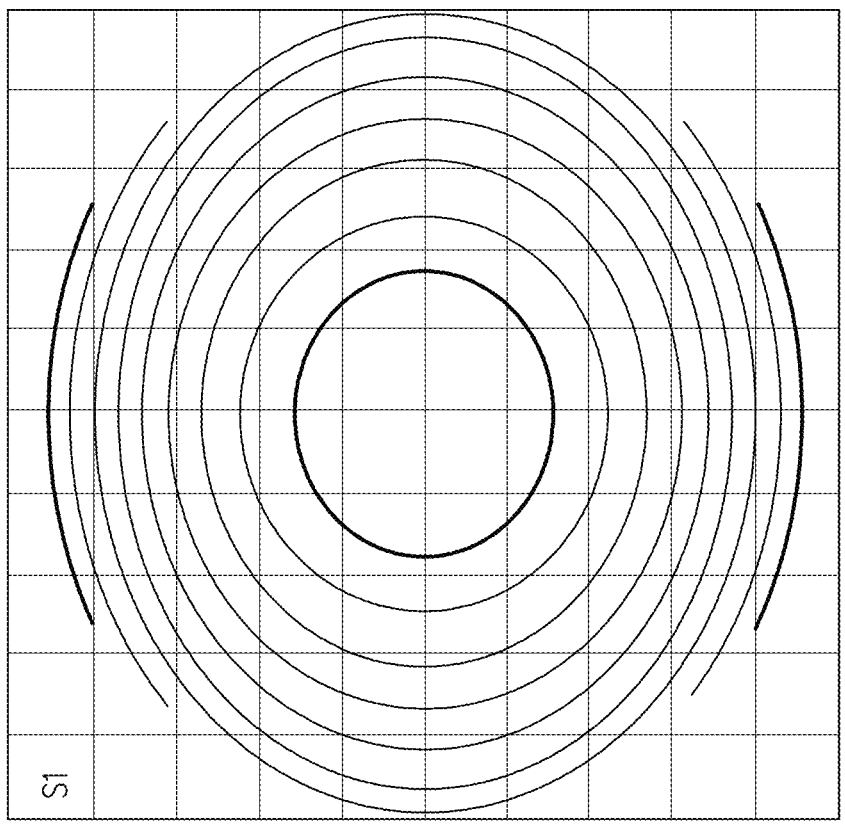

FIGS. 3A and 3B are contour plots that schematically illustrate the shapes of the front and rear surfaces of anamorphic lens 34, in accordance with an embodiment of the invention. These surfaces are labeled respectively in the figures as S1 and S2. Although lens 34 could simply be made up of two cylindrical lenses with different focal lengths and respective cylinder axes oriented in orthogonal directions, this solution has substantial astigmatism, which causes loss of optical energy due to spread of the focused beam in the directions between the ZX and YX meridional planes. In the pictured embodiment, this astigmatism is corrected by modifying the shape of surface S2, as illustrated particularly in FIG. 3B. Consequently, surface S2 is convex in the ZX plane and concave in the ZY plane, as can be seen by comparing FIGS. 2A and 2B, for example.

Figure 4:
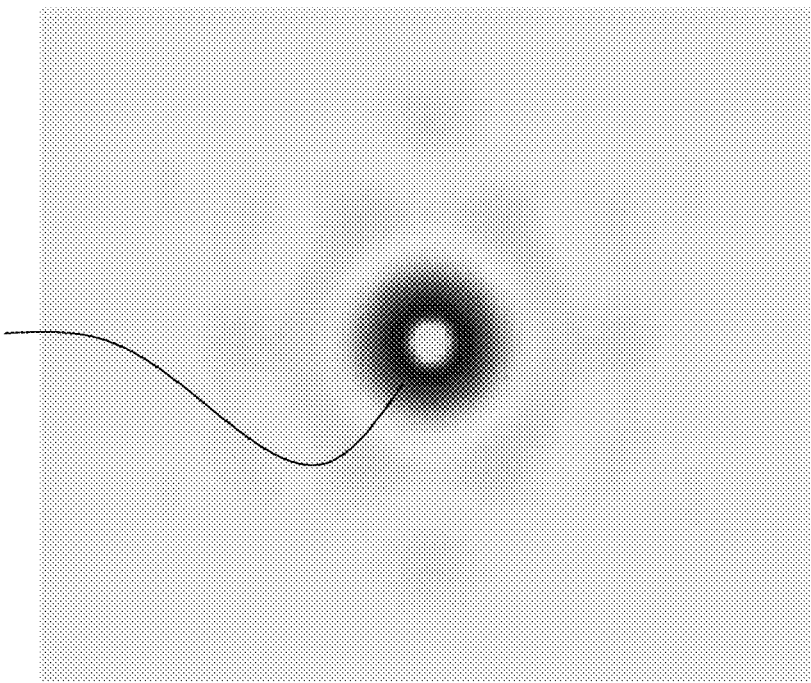
FIG. 4 is a schematic representation of a point spread function (PSF) of the anamorphic lens of FIGS. 3A/B.

FIG. 4 is a schematic representation of the point spread function (PSF) of anamorphic lens 34, in accordance with an embodiment of the invention. As a result of correcting the astigmatism as explained above, the beam energy is contained almost entirely within a small focal spot 49 on detector 38. The size of the focal spot is nearly diffraction-limited over the entire active area of the detector.

By way of example, Table I below lists aspheric data for lens 34, using bi-conic Zernike polynomial surface types. The coefficients in the table define the curvature of the lens surface in terms of the following formula:

$$\delta z = \frac{x^2/R_x + y^2/R_y}{1+\sqrt{1-(1+k_x)x^2/R_x^2-(1+k_y)y^2/R_y^2}} + \sum_i A_i x^i + \sum_j B_j y^j + \sum_n \gamma_n Z_n(\rho, \phi)$$

All coefficients in the table below are scaled to provide surface deformation in units of mm.

TABLE I

| | | | |
|---|---|---|---|
| X radius of curvature | Rx | | −11.867 |
| Y radius of curvature | Ry | 21.815 | |
| X conic constant | Kx | | −0.031 |
| Y conic constant | Ky | −5.637 | |
| Second order X aspheric departure | A2 | 8.471E−03 | −1.603E−03 |
| Fourth order X aspheric departure | A4 | −5.486E−05 | −3.468E−06 |
| Sixth order X aspheric departure | A6 | −9.673E−07 | −6.321E−06 |
| Second order Y aspheric departure | B2 | 1.486E−05 | 6.473E−04 |
| Fourth order Y aspheric departure | B4 | 9.017E−05 | 3.218E−04 |
| Sixth order Y aspheric departure | B6 | −3.382E−07 | −3.549E−05 |
| Defocus Zernike polynomial coefficient | Z4 | 0.1747 | 0.0975 |
| Astigmatism 1 Zernike polynomial | Z5 | −2.173E−06 | −1.424E−06 |
| Astigmatism 2 Zernike polynomial | Z6 | 0.056 | 0.018 |
| Normalization radius for Zernike polynomials | Rnorm | 6.51 | 3.84 |

Although the above table and figures show a particular lens design that is well suited to the needs of system 20, alternative anamorphic lens designs may be used for similar purposes, as will be apparent to those skilled in the art after reading the present description. These designs may use a single element, as in the embodiment described above, or two, three or more elements, depending on application requirements and constraints. All such alternative embodiments are considered to be within the scope of the present invention.

Figure 5:
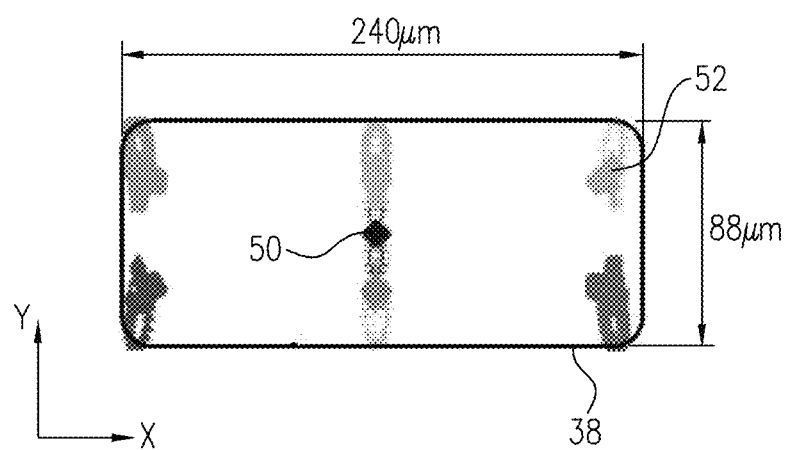
FIG. 5 is a schematic frontal view of a detector used in a LiDAR scanner, in accordance with an embodiment of the invention.

FIG. 5 is a schematic frontal view of detector 38, showing the active area of the detector in accordance with an embodiment of the invention. The active area of the detector is elongated in the X-direction in order to accommodate the streak of reflected light that occurs due to the scanning movement of mirror 26. In this particular example, the width dimension of the active area, in the X-direction, is nearly three times the height dimension, in the Y-direction. Incoming radiation along the central axis of lens 34 is focused to a spot 50 at the center of the active area of the detector. Rays reaching lens 34 off axis, as may occur due to the time lag between the transmitted and received beams in system 20, for example, are focused to spots 52 within the edges of the active area.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device having a designated scan direction, the device comprising:
   a transmitter, which is configured to emit a beam of optical radiation;
   a receiver, comprising:
      a detector, which is configured to output a signal in response to the optical radiation that is incident on an active area of the detector, the active area having a first dimension along a first axis parallel to the scan direction and a second dimension, which is less than the first dimension, along a second axis perpendicular to the scan direction; and
      an anamorphic lens, which is configured to collect and focus the optical radiation onto the active area of the detector, and which has a first focal length in a first plane containing the first axis and parallel to the scan direction and a second focal length, greater than the first focal length, in a second plane containing the second axis and perpendicular to the scan direction; and
   a scanner, which is configured to scan the beam across a target scene in the scan direction, and to direct the optical radiation that is reflected from the target scene toward the receiver.

2. The device according to claim 1, wherein the scanner comprises at least one mirror, which is configured to rotate about a rotation axis perpendicular to the scan direction, while reflecting the beam emitted by the transmitter toward the target scene and reflecting the optical radiation that is reflected from the target scene toward the receiver.

3. The device according to claim 1, wherein the scanner is configured to scan the beam across the target scene at a first scanning speed in a first scan direction and at a second scanning speed, less than the first scanning speed, in a second scan direction perpendicular to the first scan direction, wherein the first scan direction is aligned with the first axis of the detector.

4. The device according to claim 1, wherein the first dimension of the active area of the detector is at least twice the second dimension.

5. The device according to claim 1, wherein the anamorphic lens has a non-circular pupil.

6. The device according to claim 1, wherein the anamorphic lens comprises a plurality of optical surfaces, and wherein at least one of the optical surfaces is shaped so as to correct an astigmatism due to the second focal length being greater than the first focal length.

7. The device according to claim 1, wherein the transmitter is configured to emit the optical radiation as a sequence of optical pulses, and wherein the first dimension of the active area of the detector is chosen so as to accommodate an angular offset between the emitted beam and the reflected optical radiation due to a time of flight of the optical pulses.

8. The device according to claim 7, wherein the signal output by the detector is indicative of the time of flight of the optical pulses, and wherein the device comprises a controller, which is configured to process the signal so as to map a distance to the target scene.

9. An optical method, comprising:
   scanning a beam of optical radiation across a target scene in a scan direction; and
   directing the optical radiation that is reflected from the scene toward a receiver, which comprises:
      a detector, which outputs a signal in response to the optical radiation that is incident on an active area of the detector, the active area having a first dimension along a first axis, which is parallel to the scan direction, and a second dimension, which is less than the first dimension, along a second axis perpendicular to the scan direction; and
      an anamorphic lens, which collects and focuses the optical radiation onto the active area of the detector, and which has a first focal length in a first plane containing the first axis and parallel to the scan direction and a second focal length, greater than the first focal length, in a second plane containing the second axis and perpendicular to the scan direction.

10. The method according to claim 9, wherein scanning the beam comprises directing the beam from a transmitter toward at least one mirror, which rotates about a rotation axis perpendicular to the scan direction, while reflecting the beam emitted by the transmitter toward the target scene and reflecting the optical radiation that is reflected from the target scene toward the receiver.

11. The method according to claim 9, wherein the beam is scanned across the target scene at a first scanning speed in a first scan direction and at a second scanning speed, less than the first scanning speed, in a second scan direction perpendicular to the first scan direction, wherein the first scan direction is aligned with the first axis of the detector.

12. The method according to claim 9, wherein the first dimension of the active area of the detector is at least twice the second dimension.

13. The method according to claim 9, wherein the anamorphic lens has a non-circular pupil.

14. The method according to claim 9, wherein the anamorphic lens comprises a plurality of optical surfaces, and wherein at least one of the optical surfaces is shaped so as to correct an astigmatism due to the second focal length being greater than the first focal length.

15. The method according to claim 9, wherein scanning the beam comprises scanning a sequence of optical pulses toward across the target scene, and wherein the first dimension of the active area of the detector is chosen so as to accommodate an angular offset between the emitted beam and the reflected optical radiation due to a time of flight of the optical pulses.

16. The method according to claim 15, wherein the signal output by the detector is indicative of the time of flight of the optical pulses, and wherein the method comprises processing the signal so as to map a distance to the target scene.

\* \* \* \* \*